United States Patent
Yi et al.

(10) Patent No.: US 7,104,250 B1
(45) Date of Patent: Sep. 12, 2006

(54) INJECTION SPRAY PATTERN FOR DIRECT INJECTION SPARK IGNITION ENGINES

(75) Inventors: Jianwen Yi, Canton, MI (US); Huiyu Fu, Warwickshire (GB); Xiangdong Chen, Rugby (GB); Zhiyu Han, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/162,248

(22) Filed: Sep. 2, 2005

(51) Int. Cl.
*F02B 1/00* (2006.01)
*F02B 5/00* (2006.01)

(52) U.S. Cl. ....................... 123/305; 123/295

(58) Field of Classification Search ................ 123/305, 123/295, 301, 298, 294, 299
See application file for complete search history.

(56) References Cited

U.S. PATENT DOCUMENTS

| | | | |
|---|---|---|---|
| 4,790,270 A * | 12/1988 | McKay et al. ............ 123/73 C |
| 5,713,325 A * | 2/1998 | Yoshida et al. ............. 123/295 |
| 5,915,353 A * | 6/1999 | Matsumura ................. 123/298 |
| 5,941,207 A | 8/1999 | Anderson et al. |
| 6,334,427 B1 * | 1/2002 | Nakayama et al. ......... 123/305 |
| 6,675,766 B1 * | 1/2004 | Miyajima et al. ........... 123/298 |
| 6,715,463 B1 * | 4/2004 | Kudo et al. ................. 123/261 |
| 6,725,828 B1 | 4/2004 | Han et al. |
| 6,948,474 B1 * | 9/2005 | Yamaguchi et al. ........ 123/295 |

* cited by examiner

*Primary Examiner*—Mahmoud Gimie
(74) *Attorney, Agent, or Firm*—Diana D. Brehob; Bir Law, PLC

(57) ABSTRACT

A system and method for controlling combustion in a direct injection spark ignition internal combustion engine inject fuel directly into a combustion chamber through an injector having an ignition jet or group of jets positioned primarily to support stratified charge formation and a mixing jet or group of jets positioned primarily to support homogeneous charge formation. The ignition jet(s) and mixing jet(s) produce discernibly different yet well connected fuel clouds within the cylinder to provide stable combustion and reduce cylinder wall wetting by appropriate selection of the axial/longitudinal angles and radial/circumferential angles of the ignition and mixing jets.

11 Claims, 4 Drawing Sheets

INJECTION SPRAY PATTERN FOR DIRECT INJECTION SPARK IGNITION ENGINES

BACKGROUND OF THE INVENTION

1. Field of the Invention

The present invention relates to fuel injection for direct injection spark ignition internal combustion engines.

2. Background Art

Direct-injection spark-ignition (DISI) internal combustion engines have been developed to reduce fuel consumption and feedgas emissions of gasoline engines. DISI combustion technologies can generally be classified as either homogeneous charge or stratified charge systems. In homogeneous charge systems, the engine operates only in the homogeneous mode where the air-fuel mixture of the charge in the combustion chamber is generally well-mixed or homogeneous throughout the chamber. Stratified charge combustion systems operate in a stratified mode with layers or strata of richer air/fuel ratio near the spark plug and progressively leaner layers below under certain operating conditions, such as low to medium load and low to medium engine speed, for example, while operating in a homogeneous mode otherwise. Systems designed for homogeneous mode operation generally use an injector having an evenly distributed fuel spray that is well mixed with air to create a homogeneous charge. Systems designed for stratified charge mode operation require the richer fuel-air mixture in the region of the spark plug gap location and generally use an injector having jets closely arranged to form a suitable fuel cloud around the spark plug. To operate in the homogeneous mode, stratified charge systems may require design compromises or additional devices such as a variable charge motion control device or air assisted injection to achieve sufficient charge homogeneity. These design compromises generally increase complexity and associated cost and may lower the efficiency of stratified mode operation.

SUMMARY OF THE INVENTION

A system and method for fuel injection of a direct injection spark ignition internal combustion engine include a fuel spray pattern having a first plurality of ignition jets and a second plurality of mixing jets to support both homogeneous and stratified charge operating modes.

Embodiments of the present invention include a system and method for controlling combustion in a direct injection internal combustion engine that injects fuel directly into a combustion chamber through a first plurality of jets oriented to create a first fuel-air mixture cloud around a spark location and a second plurality of jets oriented to create a second fuel-air mixture cloud coupled to the first cloud. The spray momentum of the first plurality of jets, also referred to as the ignition jets, forms a vortex that draws fuel vapor out of the spray toward the spark location to form a combustible fuel-air mixture. The ignition jets may be radially oriented symmetrically or nearly symmetrically about the spark location and axially oriented so that the first cloud has less penetration into the chamber than the second cloud, which is generated by the second plurality of jets, also referred to as the mixing jets.

The present invention provides a number of advantages. For example, the present invention provides at least two groups of jets with a first group oriented to primarily support operation in a stratified charge mode, and at least a second group of jets to primarily support operation in a homogeneous charge mode. As such, the present invention may be used in both homogeneous charge and stratified charge DISI combustion systems. In addition, the present invention may be used in a stratified charge DISI combustion system without requiring additional devices, such as a charge motion control device or air assisted injection, while achieving acceptable charge homogeneity for stable operation when ambient and/or operating conditions require operation in the homogeneous mode. While use of at least two groups of injection holes or jets according to the present invention generally provides improved performance during operation of both stratified charge and homogeneous charge modes so that additional mixing devices, such as a charge motion control, swirl control, or air assisted injection are not necessary, the present invention may also be used in combination with one or more such devices if advantageous or desired.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

Figure 1:
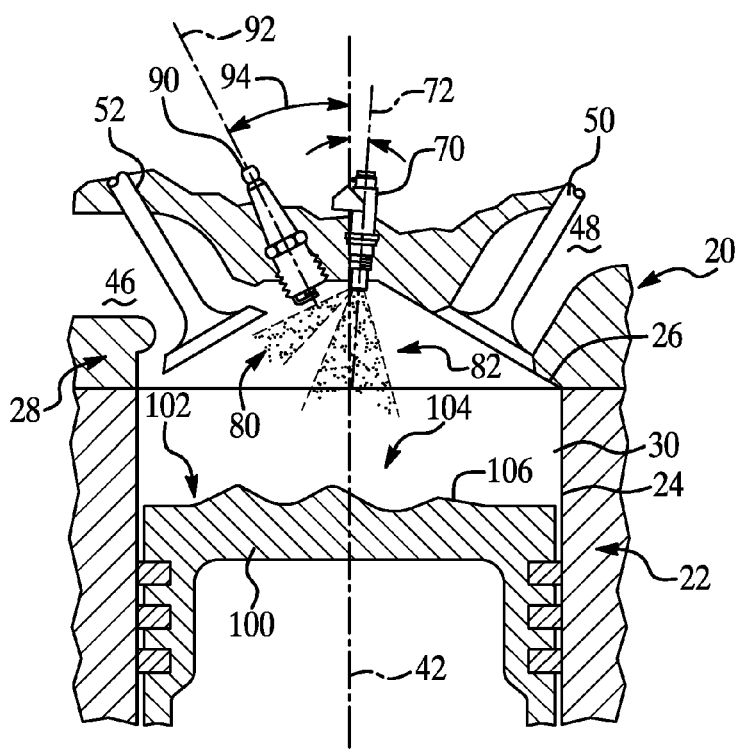
FIG. 1 is a cross-section illustrating one embodiment of direct injection using ignition jets and mixing jets according to one embodiment of the present invention.

FIG. 1 is a cross-section of a representative cylinder or combustion chamber of a multiple cylinder direct-injection internal combustion engine illustrating operation of one embodiment of a system or method for direct injection according to the present invention. Engine 20 includes an engine block 22 having a plurality of cylinder bores 24 that cooperate with corresponding pent-roof cylinder caps 26 of cylinder head 28 to form combustion chambers 30. Pent-roof cylinder caps 26 include a top portion that is generally perpendicular or normal to the longitudinal axis 42 of cylinder bore 24. The top portion is connected to two opposing ramp portions that accommodate exhaust ports 46 and intake ports 48. As will be appreciated by those of ordinary skill in the art, although one preferred embodiment includes two intake ports and two exhaust ports per cylinder (only one of each being shown in FIG. 1), the present invention may be used with engine configurations having one or more intake ports and/or one or more exhaust ports. Similarly, although illustrated with respect to a pent-roof cylinder design, the present invention may be used in applications having a variety of cylinder or combustion chamber geometries.

Each combustion chamber 30 includes an intake valve 50 for each intake port and an exhaust valve 52 for each exhaust port. Intake valve 50 selectively couples combustion chamber 30 to an associated intake manifold (not shown). Similarly, exhaust valve 52 selectively couples combustion chamber 30 to an associated exhaust manifold (not shown). Of course, the intake manifold and/or exhaust manifold may be integrally formed within cylinder head 26, or may be separate components depending upon the particular application. Intake valves 50 and exhaust valves 52 may be operated using any of a number of known strategies including a conventional camshaft arrangement, variable camshaft timing and/or variable lift arrangements, or using electromagnetic valve actuators, for example.

Each combustion chamber 30 includes an associated fuel injector 70 that may extend through top portion 50 of pent-roof cylinder cap 26. The longitudinal axis 72 of fuel injector 70 may be coincident with, or be disposed at an angle relative to cylinder longitudinal axis 42 depending upon the particular application and implementation. During operation, in response to a corresponding fuel injection signal generated by the engine controller, fuel injector 70 sprays fuel through at least two groups of holes or jets substantially simultaneously directly into combustion chamber 30 to create a fuel spray pattern that includes a mixing spray 80 and an ignition spray 82. Mixing spray 80 is positioned primarily to support operation in homogeneous mode but also cooperates with ignition spray 82 during operation in stratified charge mode. Similarly, ignition spray 82 is positioned primarily to support operation in stratified charge mode but also cooperates with mixing spray 80 during operation in homogeneous mode. Mixing spray 80 and ignition spray 82 generate vortex induced air-fuel clouds that are individually discernible yet coupled by an overlapping region as illustrated in various figures and described in greater detail herein.

As also illustrated in FIG. 1, each combustion chamber 30 includes an ignition source, such as a spark plug 90, that extends through cylinder roof 26 and is close-coupled with fuel injector 70. Spark plug 90 may extend through the top portion of cylinder 30 and may be disposed with its longitudinal axis 92 forming an angle 94 relative to cylinder axis 42. In one embodiment, angle 94 is about nine degrees (9°) with spark plug 90 inclined toward exhaust ports 46. Spark plug 90 is positioned with its spark location or gap outside the liquid fuel sprays 80, 82 but within a recirculation zone of the vortex formed by the momentum of the fuel spray to initiate combustion within combustion chamber 30 in response to a corresponding ignition timing signal from the engine controller.

A piston 100 is disposed for reciprocating movement within each cylinder bore 24. Piston 100 may include a top portion or crown 102 having a combustion bowl, indicated generally by reference numeral 104. Combustion bowl 104 may include various features to cooperate with fuel sprays 80, 82 to enhance vortex formation and stable combustion during operation in both stratified charge and homogeneous charge modes.

Figure 2:
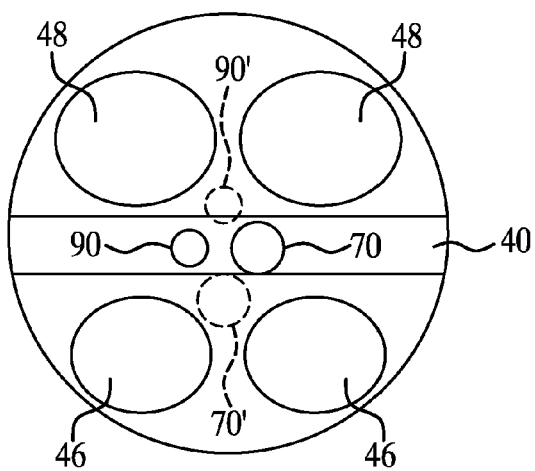
FIG. 2 is a top view schematic of two possible alternative embodiments illustrating relative positioning of an injector having at least two groups of jet holes and an ignition source according to the present invention.

FIG. 2 is a top view schematic of alternative embodiments illustrating relative positioning of injector 70 and ignition source 90 in a direct injection system or method according to the present invention. In both embodiments represented by the schematic of FIG. 2, ignition source 70 and fuel injector 90 are close-coupled and centrally located relative to exhaust ports 46 and intake ports 48. In one embodiment, the transverse axes of spark plug 70 and fuel injector 90 are positioned generally parallel to the transverse axes of exhaust ports 46 and intake ports 48. In another embodiment, the transverse axes of ignition source 70' and fuel injector 90' are positioned generally perpendicular to the transverse axes of exhaust ports 46 and intake ports 48. Those of ordinary skill in the art may recognize other alternative arrangements for positioning of the fuel injector and ignition source based on the teachings of the present invention. Likewise, the present invention may be used in applications that include a different number and/or arrangement of intake and/or exhaust valves since the fuel/air mixing and stratification according to the present invention are dominated by the fuel spray and not by the in-cylinder flow motion.

Figure 3:
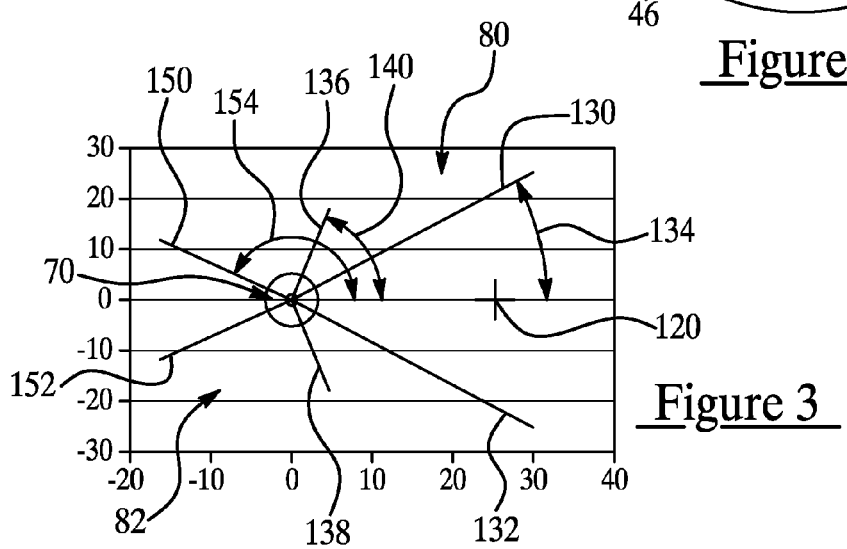
FIG. 3 is a top/bottom view of a direct injection system illustrating radial orientation of ignition and mixing jets according to one embodiment of the present invention.

FIG. 3 is a top/bottom view of a direct injection system illustrating radial orientation of ignition and mixing jets generated by a representative fuel injector according to one embodiment of the present invention. Injector 70 of the embodiment in FIG. 3 includes six holes that create corresponding fuel jets that expand during injection relative to an associated central axis represented by lines 130, 132; 136, 138; and 150, 152. Fuel jets associated with axes 130, 132 produce an ignition spray 80 generally directed toward a spark plug gap or ignition source 120. As described above, ignition spray 80 is designed primarily for operation in stratified charge mode, but also cooperates with mixing spray 82 to improve charge homogeneity when operating in homogeneous mode. Fuel jets associated with axes 136, 138 and 150, 152 produce a mixing spray represented generally by reference numeral 82. Mixing spray 82 is designed primarily for operation in homogeneous mode to reduce or minimize cylinder wall wetting and provide charge homogeneity, but cooperates with ignition spray 80 in both homogeneous and stratified operating modes to produce a coupled or linked fuel cloud to provide stable combustion under varying operating conditions. As best illustrated in FIGS. 4–7, ignition spray 80 generally extends toward ignition location 120 with a larger axial or longitudinal angle 160 (FIG. 4) and has less penetration into the combustion chamber whereas mixing spray 82 is characterized by deeper cylinder penetration due to the smaller axial angles 164, 168 (FIG. 4) associated with the mixing spray generated by jets associated with jet axes 136, 138, 150, and 152.

The embodiment of the present invention illustrated in FIG. 3 includes a six-hole injector having two groups of holes to provide an ignition spray and a mixing spray, respectively. In this embodiment, the ignition spray is provided by a first plurality or group of holes associated with axes 130, 132 and the mixing spray is provided by a second plurality of holes associated with axes 136, 138, 150, and 152. Of course, those of ordinary skill in the art will recognize that the present invention may be implemented using an injector having a different number of holes or jets to provide ignition and mixing sprays consistent with the teachings of the present invention that create corresponding fuel/air clouds that are discernibly separate, yet coupled or connected by an overlapping portion as illustrated and described herein.

As also illustrated in FIG. 3, ignition jets 130, 132 may be symmetrically positioned or nearly symmetrically positioned and form a radial angle 134 relative to an axis passing through injector 70 and ignition location 120. Similarly, mixing jets 136, 138 are symmetrically positioned and form a radial angle 140 relative to an axis passing through injector 70 and ignition location 120. Likewise, mixing jets 150, 152 may be symmetrically positioned or nearly symmetrically positioned and form a radial angle 154 relative to the axis passing through injector 70 and ignition location 120. Symmetric positioning of the various jets relative to the axis passing through the injector tip and spark plug gap or ignition location facilitates assembly of "V" engine configurations. For other engine configurations, such as in-line engine applications, symmetric positioning of the jets is not necessary to facilitate assembly.

Figure 4:
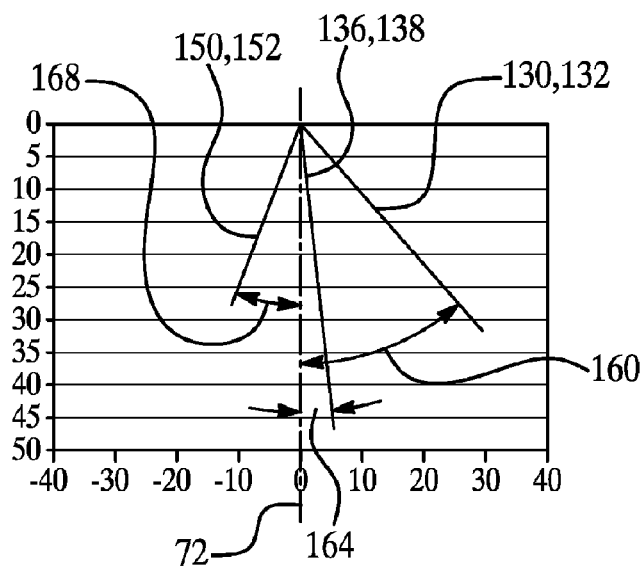
FIG. 4 illustrates axial orientation of ignition and mixing jets in a direct injection system according to one embodiment of the present invention.

FIG. 4 illustrates axial or longitudinal orientation of ignition and mixing jets in a direct injection system according to one embodiment of the present invention. As shown in FIG. 4, ignition jets 130, 132 form an angle 160 relative to the axial or longitudinal axis 72 of the fuel injector. Mixing jets 136, 138 form a smaller axial angle 164 with mixing jets 150, 152 forming an axial angle 168 having a value between that of angle 160 and 164. In one embodiment, ignition jets 130, 132 are disposed with a radial angle 134 (FIG. 3) of between about 15–25 degrees with a nominal value of twenty (20) degrees, and an axial angle 160 of between about 45–55 degrees with a nominal value of fifty (50) degrees. Mixing jets 136, 138 are disposed at a radial angle 140 (FIG. 3) of between about 69–79 degrees with a nominal value of seventy-four (74) degrees, and an axial angle of between about 16–26 degrees with a nominal value of twenty-one (21) degrees. Mixing jets 150, 152 are disposed at a radial angle of between about 137–147 degrees with a nominal value of one-hundred-forty-two (142) degrees, and an axial angle of between about 19–29 degrees with a nominal value of twenty-four (24) degrees. In this embodiment, all jets have substantially the same hole size of about 0.2 millimeters (mm), which has been empirically determined to provide desired characteristics over a wide range of fuel pressure and cylinder displacements. Similar to the number and orientation of jet holes, the jet hole diameter may vary depending on the particular application and is generally determined by the desired mass flow rate, injection pressure, and desired droplet size. Likewise, a single injector may have more jet holes of different diameters depending on the desired operating characteristics.

As illustrated in FIGS. 3 and 4, ignition jets 80 generally have a larger axial angle to provide less penetration and have a radial angle to direct the fuel spray generally toward the ignition source 120 so the resulting fuel/air cloud envelops the ignition source 120. However, the ignition location 120 and ignition jet hole(s) should be positioned so that liquid fuel does not directly contact the ignition source, which could lead to fouling and corrosion. For the representative embodiment illustrated, ignition jets 80 have an axial angle 160 of greater than about 45 degrees and therefore have less penetration than mixing jets 82, which have axial angles 164, 168 of less than about 30 degrees. Similarly, to provide desired charge formation in stratified and homogeneous operating modes, ignition jets 80 have a radial angle of less than about 25 degrees while mixing jets 82 have radial angles of greater than about 69 degrees relative to the ignition location.

Figure 5A:
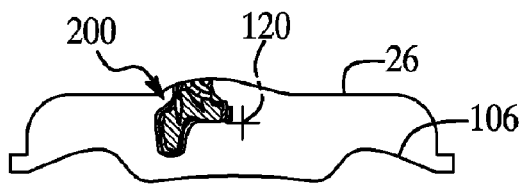
FIGS. 5A–5C are computer simulation generated in-cylinder air/fuel ratio contours illustrating operation of a system or method for direct injection according to one embodiment of the present invention.
Figure 5B:
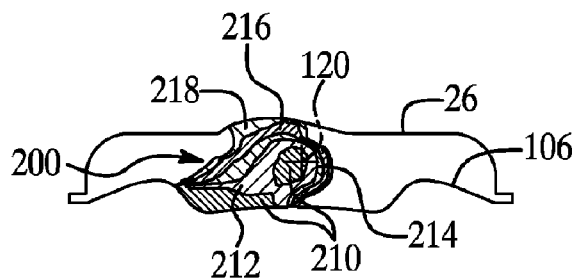
Figure 5C:
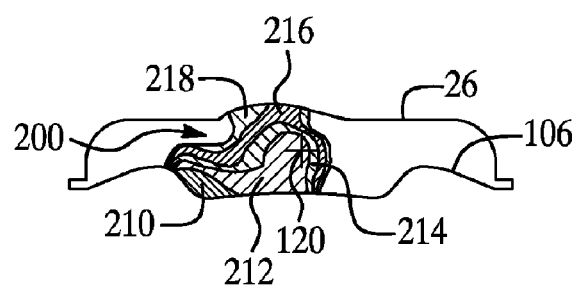

FIGS. 5A–5C are computer predicted air/fuel ratio contours illustrating charge formation during operation of a direct injection internal combustion engine in stratified charge mode according to one embodiment of the present invention. The illustrated contours were generated using computer modeling for an eight-cylinder "V" configuration engine with each cylinder having a bore and stroke of 89 millimeters (mm) and 90.3 millimeters (mm), respectively, to provide a cylinder displacement of 0.562 liters (L). The same injector jet hole arrangement was also tested in a smaller displacement four-cylinder engine with 0.4 L per cylinder (not shown). FIGS. 5A–5C correspond to fuel-air mixture evolution of a cross-section through the spark plug gap 120 and injector tip in a representative cylinder above the piston surface 106 at an engine speed of 750 RPM and a load of 1 bar BMEP at crank angles of 700, 708 and 712 degrees, respectively. Air/fuel ratio contours, indicated generally by reference numeral 200 illustrate how the ignition spray 80 and mixing spray 82 form discernibly different, yet well connected portions of a stratified charge with a combustible mixture formed around spark location 120. Contours 200 include a contour 210 representing an air/fuel ratio of less than 10:1, a contour 212 representing an air/fuel ratio of about 10–15:1, a contour 214 representing an air/fuel ratio of about 15–20:1, a contour 216 representing an air/fuel ratio of about 20–25:1, and a contour 218 representing an air/fuel ratio of about 25–30:1. The remaining space in the cylinder has an air/fuel ratio exceeding about 30:1. FIGS. 5A–5C show that fuel injection according to the present invention generates a fuel-air mixture that is stably distributed around the ignition or spark plug gap location 120 to provide stable ignition and combustion.

Figure 6A:
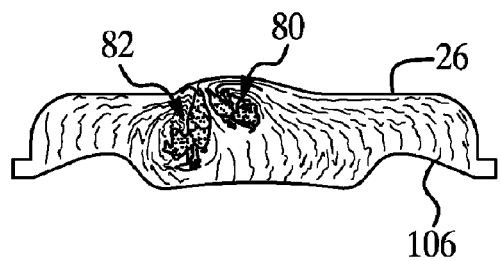
FIGS. 6A–6B illustrate computer simulated fuel spray and airflow velocity distribution during operation of a representative cylinder in a direct injection system according to one embodiment of the present invention.
Figure 6B:
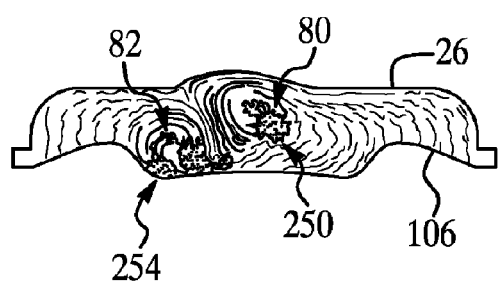

FIGS. 6A–6B illustrate computer predicted fuel spray patterns and airflow velocities during operation of a direct injection spark ignition multiple cylinder internal combustion engine operating in stratified charge mode according to the present invention. FIGS. 6A–6B represent a cross-section through a cylinder in a representative engine as described with respect to FIGS. 5A–5B operating at 750 RPM and 1 bar BMEP. FIG. 6A shows the fuel and air velocities at a crank angle of 700 degrees while FIG. 6B shows velocities at a crank angle of 704 degrees. The predicted fuel spray patterns and airflow velocities illustrate the mechanism for stable mixture formation using an injector having ignition jets and mixing jets consistent with the teachings of the present invention. As shown in this cross-section, ignition jets 80 induce a first vortex structure 250 that promotes a circular flow motion to guide the fuel vapor around the vortex center. Mixing jets 82 induce a second vortex structure 254 that is discernibly distinct rotating in an opposite direction, yet well connected with vortex 250. The radial and axial angles of the ignition jet holes of the injector are empirically selected so that the vortex center of vortex 250 generally corresponds to the spark plug gap or ignition source location. Computer simulation/modeling verifies that the axial angle of the ignition jet holes has a significant effect on the location and shape of vortex 250. Dynamometer testing verifies that the radial angle of the ignition jet holes significantly impacts the combustion burn rate with a wider separation leading to slower combustion rates. Conversely, smaller radial angles increase the likelihood of liquid fuel contacting the spark plug or ignition source and leading to fouling and/or corrosion.

As previously described, the orientation of mixing jets 82 is selected primarily to facilitate homogeneous charge formation. However, the orientation also supports operation in stratified charge mode and is selected to keep the associated fuel cloud linked or coupled to the fuel cloud produced by ignition jets 80 to control the combustion burn rate and promote stable combustion.

Figure 7A:
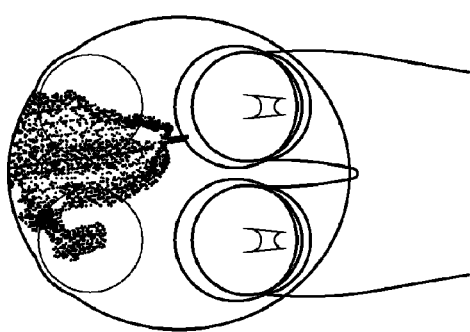
FIGS. 7A–7C illustrate computer simulated fuel droplet distribution in a cylinder during operation of a direct injection system according to one embodiment of the present invention.
Figure 7B:
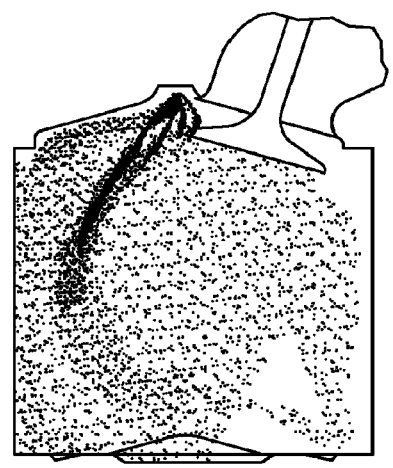
Figure 7C:
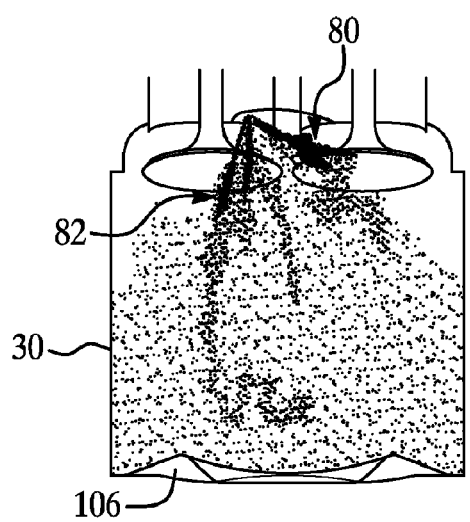

FIGS. 7A–7C illustrate computer simulated fuel droplet distribution in a cylinder in a direct injection spark ignition internal combustion engine according to one embodiment of the present invention during operation in homogeneous mode. FIG. 7A is a top view while FIG. 7B is a cross-sectional front view and FIG. 7C is a cross-sectional side view. The computer predicted fuel droplet distribution illustrated in FIGS. 7A–7C corresponds to a representative engine as described with reference to FIGS. 5A–5C operating in homogeneous mode at 6000 RPM, wide-open throttle (WOT) at a crank angle of 500 degrees (140 degrees after top-dead-center (ATDC)) and a start of injection that occurred at 360 degrees crank angle, which corresponds to top-dead-center (TDC) of an intake stroke. As FIGS. 7A–7C (and FIG. 8 described below) illustrate, the present invention produces a more even fuel spray distribution and reduces cylinder wall wetting during homogeneous mode operation relative to a conventional injector. Computer modeling/simulation indicates that the present invention may reduce cylinder liner wetting from 12.0% of fuel droplets impinging on the cylinder liner to 1.0% of fuel droplets impinging on the cylinder liner at 6000 RPM, WOT with a start of injection at the TDC of the intake stroke (360 degrees crank angle).

Figure 8:
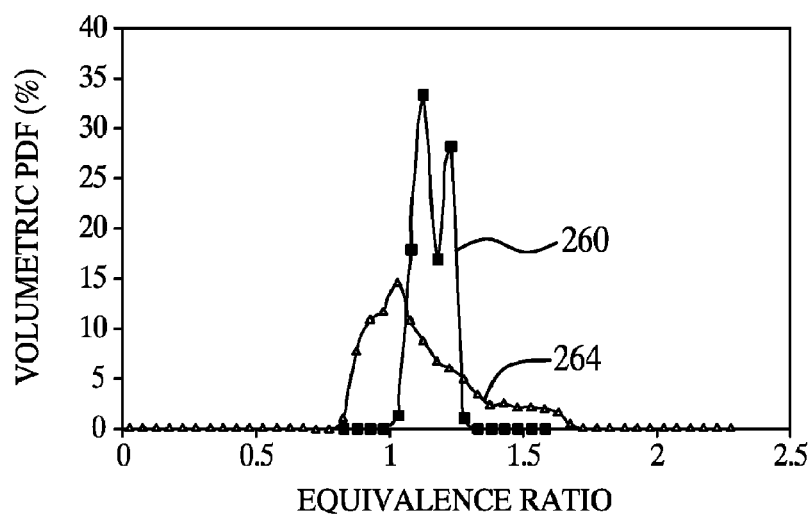
FIG. 8 illustrates a computer simulated fuel-air mixing volumetric probability density function distribution of one embodiment of the present invention relative to a reference system.

The improved homogeneity of the fuel-air mixture during operation in homogeneous charge mode illustrated in FIGS. 7A–7C is quantified and compared to a conventional injector under the same operating conditions in the graph of FIG. 8. A system having ignition and mixing jets according to the present invention is represented by line 260 with a conventional or reference system represented by line 264. FIG. 8 illustrates the computer predicted fuel-air mixing homogeneity at 1500 RPM, WOT with a start of injection at 430 degrees and plots the volumetric probability density function (PDF) distribution as a function of equivalence ratio. The narrower distribution and higher peak of line 260 represents a more homogeneous charge than the lower peak and wider distribution of the conventional injector represented by line 264.

Figure 9:
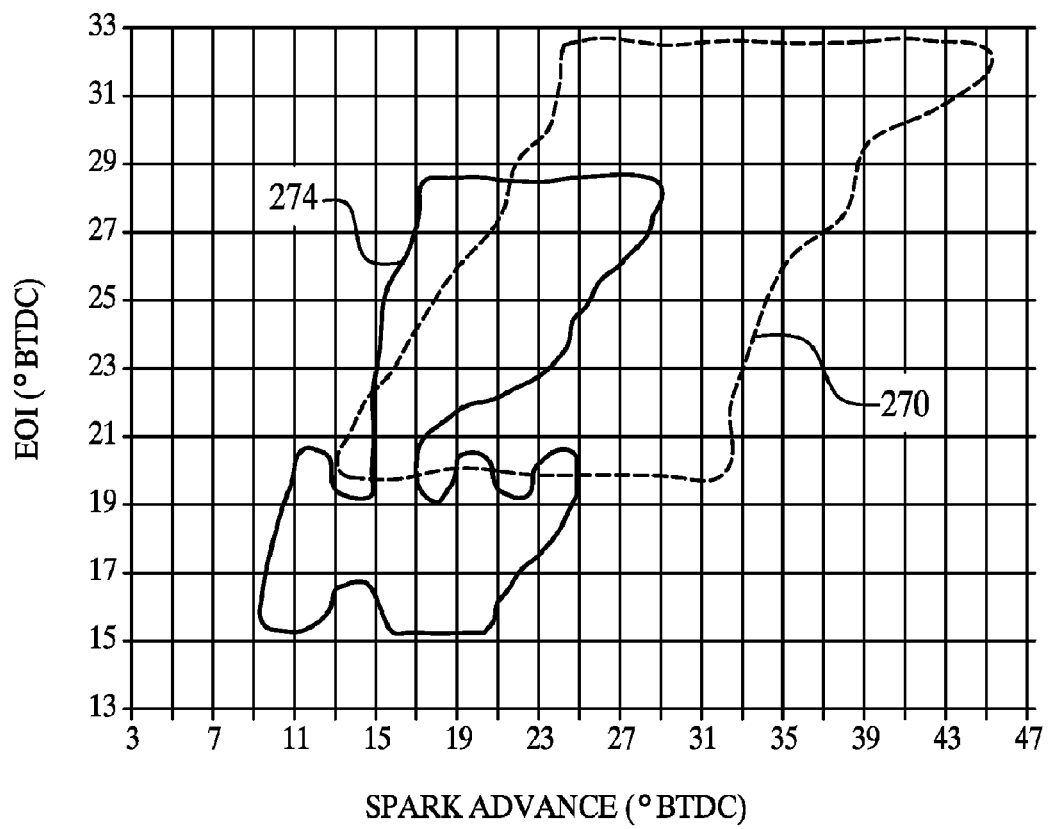
FIG. 9 illustrates dynamometer measured misfires during operation of a single cylinder embodiment of the present invention relative to a reference system.

One embodiment of the present invention was tested using a single cylinder engine having a bore and stroke of 79 mm and 81.4 mm, respectively, with a corresponding displacement of 0.4 L. The relative position of the injector and spark plug gap were the same as in the computer simulation/modeling previously described. Dynamometer measured misfire counters for 300 continuous operating cycles with a range of injection timing and spark timing at 2000 RPM and 2 bar BMEP in stratified charge mode were used to generate diagram of FIG. 9. As shown the misfire-free operating region represented by contour 270 associated with a system/method according to the present invention is significantly larger than the misfire-free operating region represented by contour 274 associated with a conventional reference system.

Figure 10:
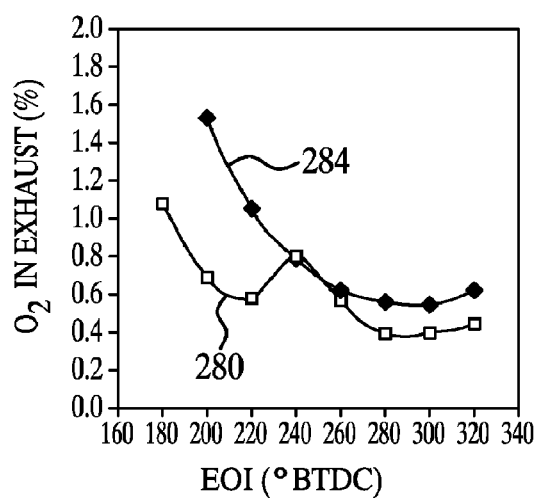
FIG. 10 illustrates dynamometer measured feedgas oxygen concentration during operation of a single cylinder embodiment of the present invention relative to a reference system.
Figure 11:
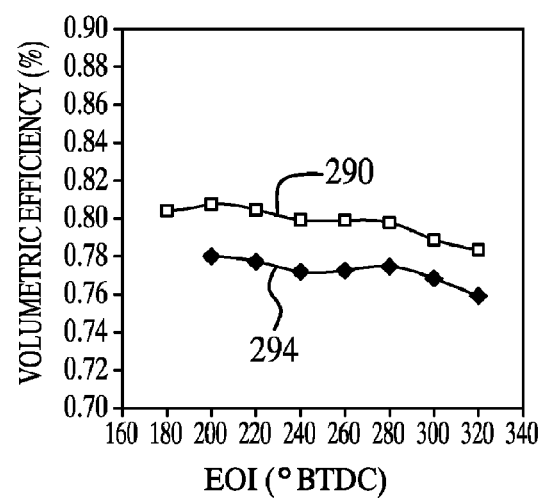
FIG. 11 illustrates dynamometer measured volumetric efficiency for a single cylinder embodiment of the present invention relative to a reference system.

FIGS. 10 and 11 illustrate performance of a system according to the present invention relative to a conventional reference system. A plot of the percent oxygen in the feedgas exhaust (before any after treatment devices) as a function of end of injection (EOI) is shown in FIG. 10. The plot was generated using dynamometer measured oxygen emission at 2000 RPM, WOT with line 280 representing the system/method of the present invention using ignition and mixing jets, and line 284 representing the reference system. FIG. 10 confirms that the system/method of the present invention reduces oxygen feed gas emissions, which is indicative of better mixing of the fuel and air in the cylinder, resulting in more efficient combustion.

FIG. 11 illustrates the improvement in volumetric efficiency associated with a system/method according to the present invention plotted under the same operating conditions as FIG. 10. Line 290 represents the volumetric efficiency of a system/method having the ignition and mixing jets according to the present invention while line 294 represents the volumetric efficiency of a conventional reference system/method. The improvement in the volumetric efficiency may also be attributed to the better mixing and charge homogeneity of the present invention.

As such, the present invention provides at least two groups of jets with a first group oriented to primarily support operation in a stratified charge mode, and at least a second group of jets oriented to primarily support operation in a homogeneous charge mode. As such, the present invention may be used in both homogeneous charge and stratified charge DISI combustion systems. In addition, the present invention may be used in a stratified charge DISI combustion system without requiring additional devices, such as a charge motion control device or air assisted injection, while achieving acceptable charge homogeneity for stable operation when ambient and/or operating conditions require operation in the homogeneous mode. While use of at least two groups of injection holes or jets according to the present invention generally provides improved performance during operation of both stratified charge and homogeneous charge modes so that additional mixing devices, such as a charge motion control, swirl control, or air assisted injection are not necessary, the present invention may also be used in combination with one or more such devices if advantageous or desired.

While the best mode for carrying out the invention has been described in detail, those familiar with the art to which this invention relates will recognize various alternative designs and embodiments for practicing the invention as defined by the following claims.

What is claimed is:

1. A direct-injection internal combustion engine operable in both stratified charge and homogeneous charge modes and having a plurality of combustion chambers within an engine block and cylinder head, the combustion chambers including at least one intake port and at least one exhaust port, the engine comprising:

a fuel injector centrally located in each combustion chamber, the fuel injector injecting fuel directly into the associated combustion chamber through a first plurality of jet holes oriented at a first radial angle and first axial angle to form a vortex that draws fuel vapor out of the spray toward an ignition location to create a first fuel/air cloud and through a second plurality of jet holes oriented at a second radial angle and a second axial angle to create a second fuel-air cloud discernible from, but coupled to the first fuel/air cloud; and an ignition source close coupled to the fuel injector and centrally located within each combustion chamber and having an ignition location positioned between two of the first plurality of jet holes outside of the fuel spray and within a recirculation zone of the vortex in the first fuel/air cloud formed substantially by the first plurality of jet holes.

2. The engine of claim 1 wherein the first plurality of jet holes comprises at least two jet holes symmetrically positioned relative to the ignition location.

3. The engine of claim 1 wherein the second plurality of jet holes comprises at least two jet holes symmetrically positioned relative to the ignition location.

4. The engine of claim 3 wherein the second plurality of jet holes comprises a first group of jet holes positioned at the second radial and axial angles and a second group of jet holes positioned at a third radial angle.

5. The engine of claim 4 wherein the second group of jet holes is positioned at a third axial angle.

6. The engine of claim 1 wherein the at least one first jet hole is positioned at axial and radial angles to facilitate stratified charge formation.

7. The engine of claim 1 wherein the at least one second jet hole is positioned at axial and radial angles to facilitate homogeneous charge formation.

8. A direct-injection internal combustion engine operable in both stratified charge and homogeneous charge modes and having a plurality of pent-roof combustion chambers formed a cylinder head and engine block, the combustion chambers including at least one intake port and at least one exhaust port, the engine comprising:

a spray-guided fuel injector centrally located between the intake and exhaust valves in the roof of each combustion chamber, the fuel injector injecting fuel directly into the associated combustion chamber through a plurality of ignition jet holes located at a first axial angle and radially symmetrical about an ignition location to form a first vortex rotating in a first direction that draws fuel vapor out of the spray toward the ignition location to create a first fuel/air cloud surrounding the ignition location for reliable ignition and stable combustion, and through a plurality of mixing jet holes oriented at a second axial angle in a direction generally opposite the ignition location to create a second vortex rotating in a second direction to generate a second fuel-air cloud discernible from, but coupled to, the first fuel/air cloud to provide a homogeneous fuel/air mixture; and an ignition source close coupled to the fuel injector and centrally located between the intake and exhaust valves in the roof of each combustion chamber with the ignition location positioned within a recirculation zone of the vortex associated with the first fuel/air cloud formed substantially by the plurality of ignition jet holes.

9. The engine of claim 8 wherein the ignition jets of the spray-guided fuel injector are positioned at an axial angle such that the first fuel/air cloud has less penetration into the combustion chamber than the second fuel/air cloud.

10. The engine of claim 8 wherein the spray-guided fuel injector comprises a third plurality of mixing jets positioned at a third axial angle to provide a homogenous fuel/air mixture.

11. The engine of claim 8 wherein the first and second fuel clouds are formed before liquid fuel contacts a piston within the cylinder.

\* \* \* \* \*